United States Patent
Chen (10) Patent No.: US 9,110,328 B2
(45) Date of Patent: Aug. 18, 2015

(54) COLOR FILTER AND MANUFACTURING METHOD FOR THE SAME

(75) Inventor: Hsiao-hsien Chen, Shenzhen (CN)

(73) Assignee: SHENZHEN CHINA STAR OPTOELECTRONICS TECHNOLOGY CO. LTD., Shenzhen (CN)

(*) Notice: Subject to any disclaimer, the term of this patent is extended or adjusted under 35 U.S.C. 154(b) by 0 days.

(21) Appl. No.: 13/641,131

(22) PCT Filed: May 23, 2012

(86) PCT No.: PCT/CN2012/075957
§ 371 (c)(1),
(2), (4) Date: Oct. 15, 2012

(87) PCT Pub. No.: WO2013/166752
PCT Pub. Date: Nov. 14, 2013

(65) Prior Publication Data
US 2015/0055238 A1    Feb. 26, 2015

(30) Foreign Application Priority Data
May 11, 2012  (CN) .......................... 2012 1 0146599

(51) Int. Cl.
*G02F 1/1335*  (2006.01)
*G02B 5/20*    (2006.01)
*G02B 5/23*    (2006.01)

(52) U.S. Cl.
CPC .......... *G02F 1/133516* (2013.01); *G02B 5/201* (2013.01); *G02B 5/23* (2013.01); *G02F 1/133512* (2013.01); *G02F 2001/133519* (2013.01)

(58) Field of Classification Search
CPC .......... G02B 5/201; G02B 5/22; G02B 5/223; G02B 5/20; G02F 1/133516; G02F 1/133514
USPC .......................................... 359/891
See application file for complete search history.

(56) References Cited

U.S. PATENT DOCUMENTS

| | | | |
|---|---|---|---|
| 2007/0188577 A1* | 8/2007 | Choi et al. ................ | 347/103 |
| 2009/0015957 A1* | 1/2009 | Kamada et al. ........... | 359/891 |
| 2010/0290143 A1* | 11/2010 | Kim et al. ................ | 359/891 |
| 2011/0290138 A1* | 12/2011 | Kim et al. ................ | 101/491 |

* cited by examiner

*Primary Examiner* — Scott J Sugarman
*Assistant Examiner* — Ephrem Mebrahtu
(74) *Attorney, Agent, or Firm* — Mark M. Friedman (57) ABSTRACT

The present invention provides a color filter and a manufacturing method thereof. A transparent dyeable material is coated on a roller, and then imprint onto a patterned mold. A part of the transparent dyeable material is retained on the roller, and then imprinted onto a substrate by the roller and forms a black matrix (BM) layer through a dyeing process and a curing process in sequence. The other part of the transparent dyeable material is transferred onto the patterned mold for forming a plurality of softened color resist layers by the dyeing process, and then forms a plurality of color resist layers by a curing process after transferring the softened color resist layers onto the substrate having the BM layer.

16 Claims, 9 Drawing Sheets

FIG. 1A

(PRIOR ART)

FIG. 1B

(PRIOR ART)

COLOR FILTER AND MANUFACTURING METHOD FOR THE SAME

BACKGROUND OF THE INVENTION

1. Field of the Invention

The present invention relates to a field of liquid crystal display technology, and more particularly, to a color filter and a manufacturing method for the same.

2. Description of the Prior Art

Figure 1A:
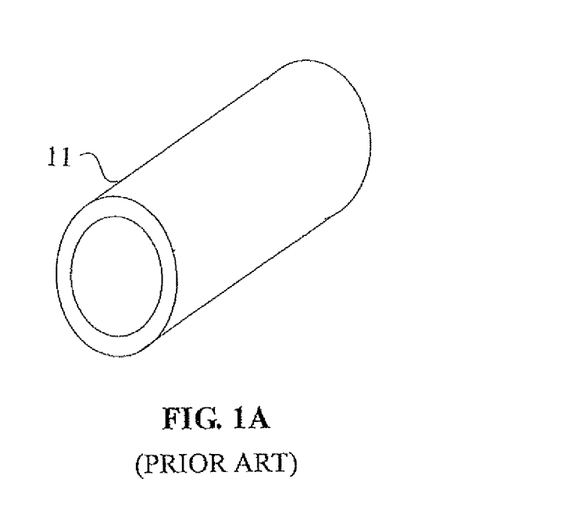
FIGS. 1A to 1C are schematic views of a structure of a manufacturing process for a traditional color filter.
Figure 1B:
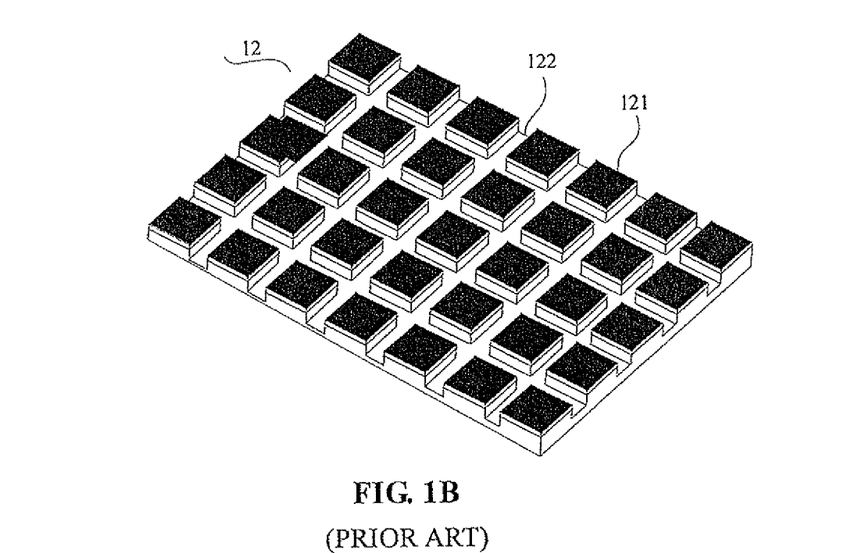
Figure 1C:
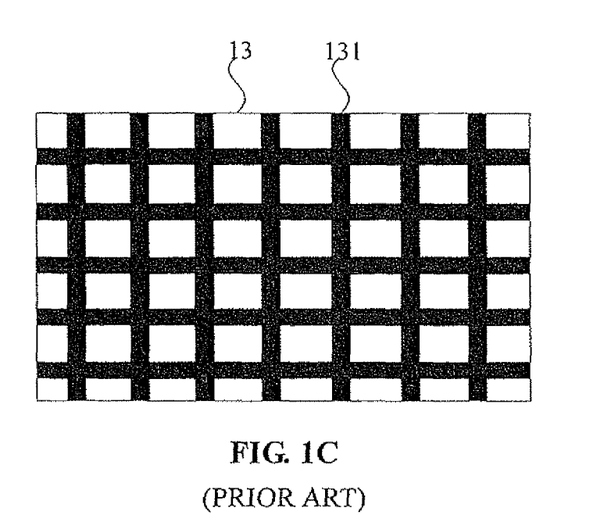

In a manufacturing process for a color filter (CF) according to the prior art, there is a technique which includes steps of: providing a roller 11, and coating black photoresist onto the roller 11 (please refer to FIG. 1A); rolling the roller 11 along a patterned template 12, wherein the black photoresist of a first pattern 121 (the first pattern 121 corresponding to a pixel display area of a liquid crystal display) corresponding to the patterned template 12 is transferred on the patterned template 12, and the roller 11 remains only the black photoresist of a second pattern 122 (the second pattern 122 corresponding to a non-display area of the liquid crystal display) corresponding to the patterned template 12 (please refer to FIG. 1B); and transferring the black photoresist having the second pattern 122 onto a substrate 13 on the roller 11, thereby forming a black matrix (BM) layer 131 (please refer to FIG. 1C).

There are two possible ways to treat the black photoresist remained on the patterned template 12:

a first way is achieved by recycling the residual black photoresist, but since the black photoresist has been exposed to the air, and therefore causes a solvent within the black photoresist to be volatilized and changes to properties of the black photoresist, thereby affecting the yield of a reusable aspect;

a second way is achieved by removing the residual black photoresist, and such way will undoubtedly increase material costs.

SUMMARY OF THE INVENTION

One object of the present invention is to provide a method for manufacturing a color filter, so as to solve the prior art problem which residual black photoresist is removed to cause material waste or the residual black photoresist is reused to affect the yield after manufacturing a black matrix (BM) layer by black photoresist.

To overcome the above-mentioned disadvantages, the present invention constructs a method for manufacturing the color filter, wherein the method includes the following steps of:

providing a roller, and coating a transparent dyeable material onto the roller;

providing a patterned mold, wherein a surface of the patterned mold includes a first pattern and a second pattern, and then rolling the roller along the surface of the patterned mold, wherein the transparent dyeable material corresponding to the first pattern is adhered on the patterned mold, and the transparent dyeable material corresponding to the second pattern is still remained on the roller;

providing a substrate, and then pressing the roller onto the substrate as well as the roller being rolled along a surface of the substrate, so as to imprint the transparent dyeable material on the roller onto the substrate; and forming a matrix layer having the second pattern on the substrate, and then dyeing and curing the matrix layer to form a black matrix (BM) layer;

dyeing the transparent dyeable material having the first pattern on the patterned mold to form a plurality of softened color resist layers, imprinting the softened color resist layers onto the substrate having the BM layer, and then curing the softened color resist layers imprinted on the substrate to form a plurality of color resist layers, the color resist layers including a first color resist layer, a second color resist layer and a third color resist layer; and forming a transparent conductive layer and spacers onto the substrate having the BM layer and the color resist layers.

In one exemplary embodiment of the present invention, the patterned mold includes a plate-like template or a roller.

In one exemplary embodiment of the present invention, the patterned mold is the plate-like template, that is, a patterned template. The step of imprinting the softened color resist layers onto the substrate having the BM layer further includes a step of:

providing an additional roller, and then imprinting the softened color resist layers on the patterned template onto the substrate having the BM layer by the additional roller.

In one exemplary embodiment of the present invention, the second pattern is sunk in relation to the first pattern. When the roller is rolled along the patterned mold, a force is applied to the roller along a direction which is perpendicular to the surface of the patterned mold, so that the transparent dyeable material that contacts the first pattern is adhered onto the patterned mold, and the transparent dyeable material corresponding to the second pattern is still remained on the roller.

In one exemplary embodiment of the present invention, the patterned mold is the roller, that is, a patterned roller. When the patterned roller is rolled along the substrate having the BM layer to imprint the softened color resist layers on the patterned roller onto the substrate having the BM layer, controlling the BM layer and the softened color resist layers to be interlaced.

In one exemplary embodiment of the present invention, when the additional roller is rolled along the substrate having the BM layer to imprint the softened color resist layers on the additional roller onto the substrate having the BM layer, controlling the BM layer and the softened color resist layers to be interlaced.

In one exemplary embodiment of the present invention, the transparent dyeable material having the second pattern on the substrate is dyed by a micro ink-jet technology to form the BM layer. Furthermore, the transparent dyeable material having the first pattern on the patterned mold is dyed by another micro ink-jet technology to form the softened color resist layers.

Another object of the present invention is to provide a method for manufacturing a color filter, so as to solve the prior art problem which residual black photoresist is removed to cause material waste or the residual black photoresist is reused to affect the yield after manufacturing a BM layer by black photoresist.

To overcome the above-mentioned disadvantages, the present invention constructs a method for manufacturing the color filter, wherein the method includes the following steps of:

providing a roller, and coating a transparent dyeable material onto the roller;

providing a patterned mold, wherein a surface of the patterned mold includes a first pattern and a second pattern, and then rolling the roller along the surface of the patterned mold, wherein the transparent dyeable material corresponding to the first pattern is adhered on the patterned mold, and the transparent dyeable material corresponding to the second pattern is still remained on the roller;

providing a substrate, and then pressing the roller onto the substrate as well as the roller being rolled along a surface of the substrate, so as to imprint the transparent dyeable material on the roller onto the substrate; and forming a matrix layer having the second pattern on the substrate, and then dyeing and curing the matrix layer to form a black matrix (BM) layer; and dyeing the transparent dyeable material having the first pattern on the patterned mold to form a plurality of softened color resist layers, imprinting the softened color resist layers onto the substrate having the BM layer, and then curing the softened color resist layers imprinted on the substrate to form a plurality of color resist layers.

In one exemplary embodiment of the present invention, the patterned mold includes a plate-like template or a roller.

In one exemplary embodiment of the present invention, the patterned mold is the plate-like template, that is, a patterned template. The step of imprinting the softened color resist layers onto the substrate having the BM layer further includes a step of:

providing an additional roller, and then imprinting the softened color resist layers on the patterned template onto the substrate having the BM layer by the additional roller.

In one exemplary embodiment of the present invention, after the softened color resist layers imprinted on the substrate are cured to form the color resist layers, and further includes the following step of:

forming a transparent conductive layer and spacers onto the substrate having the BM layer and the color resist layers.

In one exemplary embodiment of the present invention, the second pattern is sunk in relation to the first pattern. When the roller is rolled along the patterned mold, a force is applied to the roller along a direction which is perpendicular to the surface of the patterned mold, so that the transparent dyeable material that contacts the first pattern is adhered onto the patterned mold, and the transparent dyeable material corresponding to the second pattern is still remained on the roller.

In one exemplary embodiment of the present invention, the patterned mold is the roller, that is, a patterned roller. When the patterned roller is rolled along the substrate having the BM layer to imprint the softened color resist layers on the patterned roller onto the substrate having the BM layer, controlling the BM layer and the softened color resist layers to be interlaced.

In one exemplary embodiment of the present invention, when the additional roller is rolled along the substrate having the BM layer to imprint the softened color resist layers on the additional roller onto the substrate having the BM layer, controlling the BM layer and the softened color resist layers to be interlaced.

In one exemplary embodiment of the present invention, the color resist layers include a first color resist layer, a second color resist layer and a third color resist layer.

In one exemplary embodiment of the present invention, the transparent dyeable material having the second pattern on the substrate is dyed by a micro ink-jet technology to form the BM layer. Furthermore, the transparent dyeable material having the first pattern on the patterned mold is dyed by another micro ink-jet technology to form the softened color resist layers.

Yet another object of the present invention is to provide a method for manufacturing a color filter, so as to solve the prior art problem which residual black photoresist is removed to cause material waste or the residual black photoresist is reused to affect the yield after manufacturing a BM layer by black photoresist.

To overcome the above-mentioned disadvantages, the present invention constructs the color filter, which includes the BM layer and a plurality of color resist layers. The BM layer and the color resist layers are arranged and separated from each other, and the BM layer and the color resist layers are formed by dyeing and curing a transparent dyeable material.

In one exemplary embodiment of the present invention, the color resist layers include a first color resist layer, a second color resist layer and a third color resist layer.

In one exemplary embodiment of the present invention, a transparent conductive layer and spacers are further formed on the BM layer and the color resist layers.

In a manufacturing process for the color filter according to the present invention, the transparent dyeable material is coated on the roller, and then imprint onto the patterned mold. Thus, the transparent dyeable material is classified into two parts: a part of the transparent dyeable material is retained on the roller, and then imprinted onto the substrate by the roller to form the matrix layer, and then the BM layer is formed by a dyeing process and a curing process in sequence; and another part of the transparent dyeable material is transferred onto the patterned mold for forming the softened color resist layers by the dyeing process, and then forms the color resist layers by a curing process after transferring the softened color resist layers onto the substrate having the BM layer. Apparently, the present invention is capable of sufficiently utilizing the transparent dyeable material, thereby vastly reducing production costs.

The above objectives, other objectives, features, advantages and embodiments of the present invention will be better understood from the following description being considered in connection with the accompanied drawings and in which a preferred embodiment of the invention is illustrated by way of example.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "left," "right," "inside," "outside," "side," etc., is used with reference to the orientation of the Figure(s) being described. As such, the directional terminology is used for purposes of illustration and is in no way limiting. Throughout this specification and in the drawings like parts will be referred to by the same reference numerals.

Figure 2:
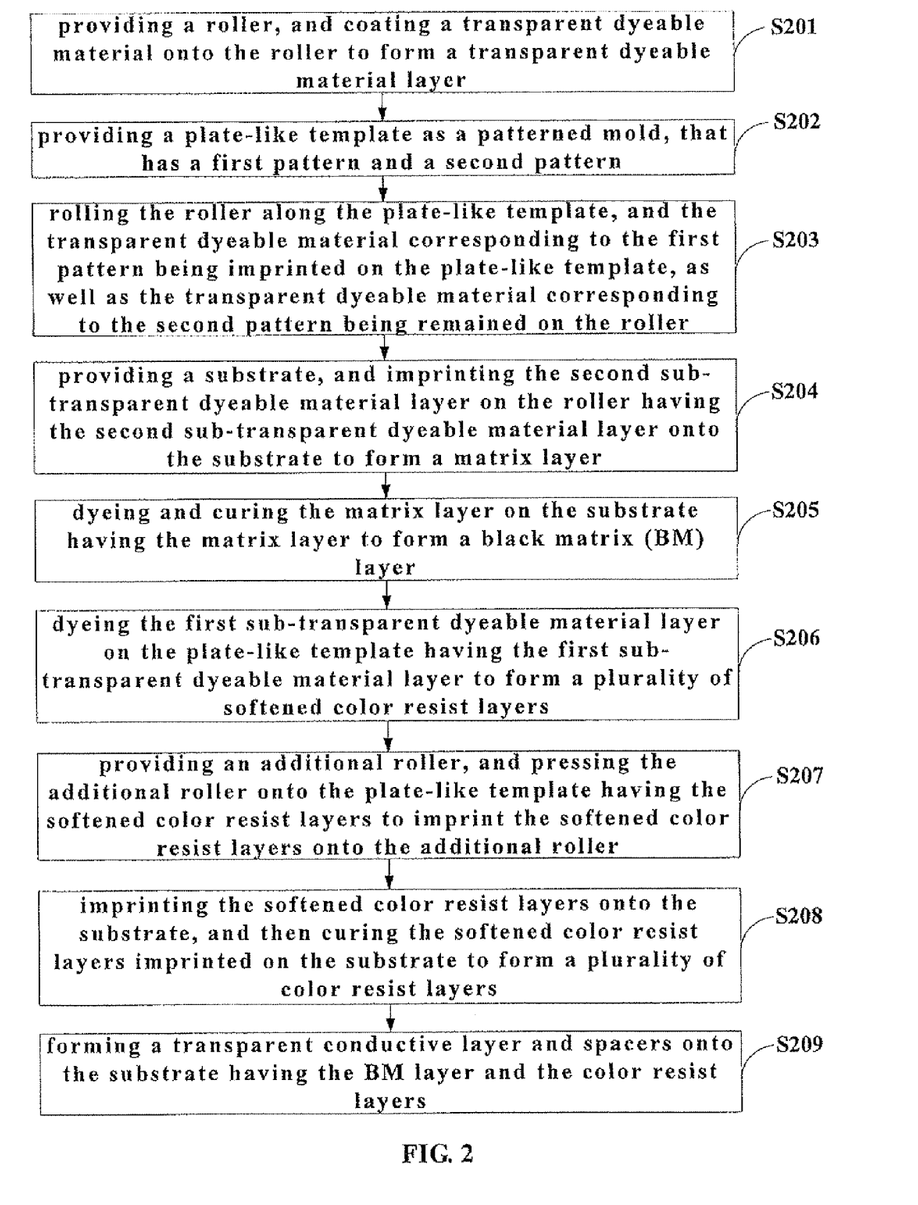
FIG. 2 is a flow chart of a method according to the preferred embodiment of the present invention for manufacturing a color filter.

FIG. 2 is a flow chart of a method according to the preferred embodiment of the present invention for manufacturing a color filter. FIGS. 3A to 3K are schematic views of a structure of a manufacturing process for the color filter according to the first preferred embodiment of FIG. 2.

Figure 3A:
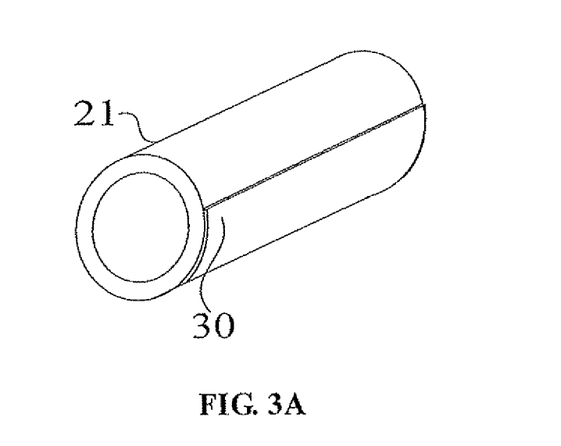
FIGS. 3A to 3K are schematic views of a structure of a manufacturing process for the color filter according to the preferred embodiment of FIG. 2.

In step S201, provided is a roller 21, a transparent dyeable material is coated on the roller 21 to form a transparent dyeable material layer 30 (please also refer to FIG. 3A).

Figure 3B:
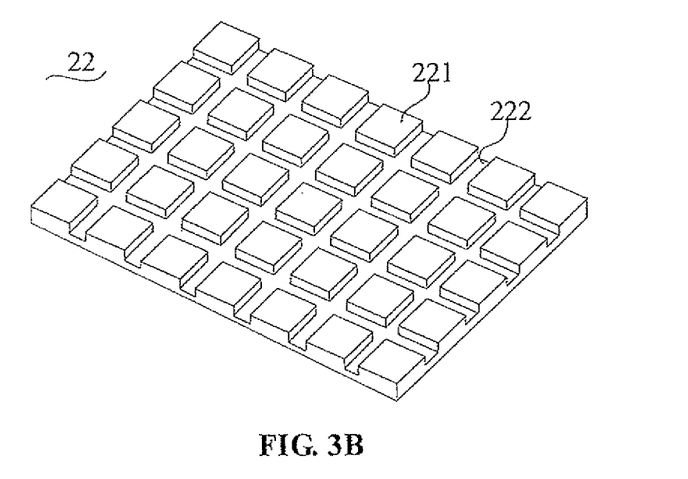
Figure 3C:
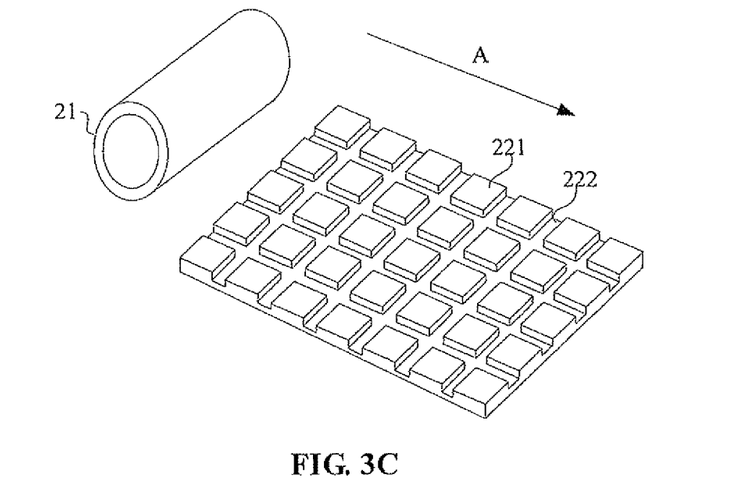
Figure 3D:
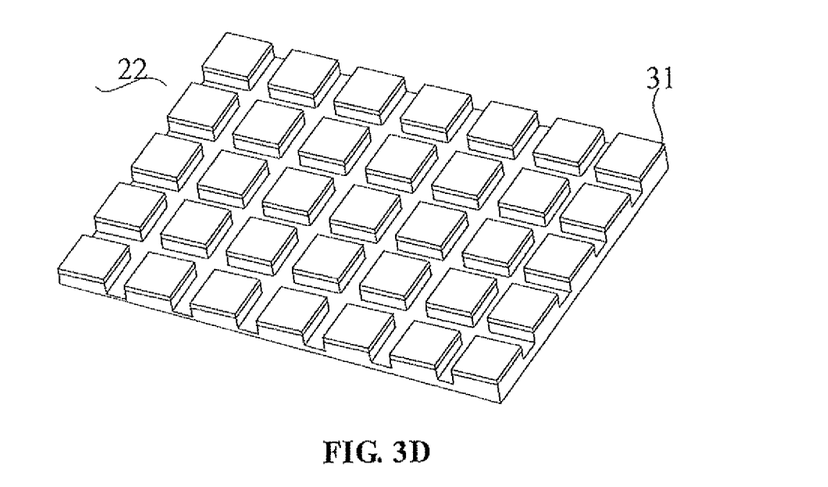
Figure 3E:
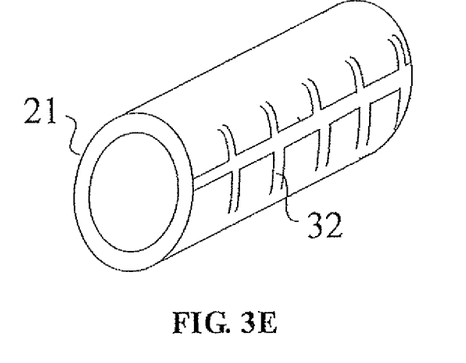

In step S202, a plate-like template 22 is provided as a patterned mold, that is, a patterned template (please refer to FIG. 3B). A surface of the plate-like template 22 has a first pattern 221 and a second pattern 222.

In step S203, the roller 21 is pressed on the plate-like template 22 as well as the roller being rolled in direction of labeled "A" (please refer to FIG. 3C) along a surface of the plate-like template 22. In a rolling process, the transparent dyeable material that contacts the first pattern 221 is imprinted on the plate-like template 22, and the transparent dyeable material corresponding to the second pattern 222 is still remained on the roller 21.

The second pattern 222 is sunk in relation to the first pattern 221. Thus in a process for rolling the roller 21, a force is capable of applying to the roller. The force is perpendicular to a surface of the plate-like template 22. Therefore, the transparent dyeable material that contacts the first pattern 221 is imprinted from the roller 21 to the plate-like template 22 by the force to form a first sub-transparent dyeable material layer 31 (please refer to FIG. 3D). However, the transparent dyeable material corresponding to the second pattern 222 on the roller 21 has not undergone an effect of the force, thereby still remaining onto the roller 21, and forming a second sub-transparent dyeable material layer 32. The second sub-transparent dyeable material layer 32 has a shape of the second pattern 222 (please refer to FIG. 3E).

Figure 3F:
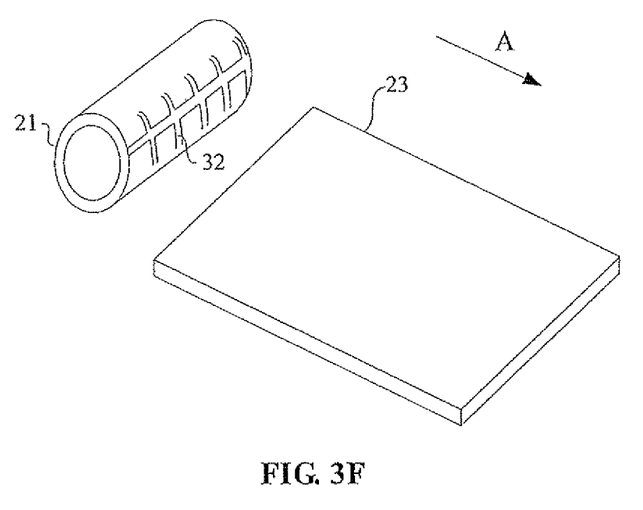
Figure 3G:
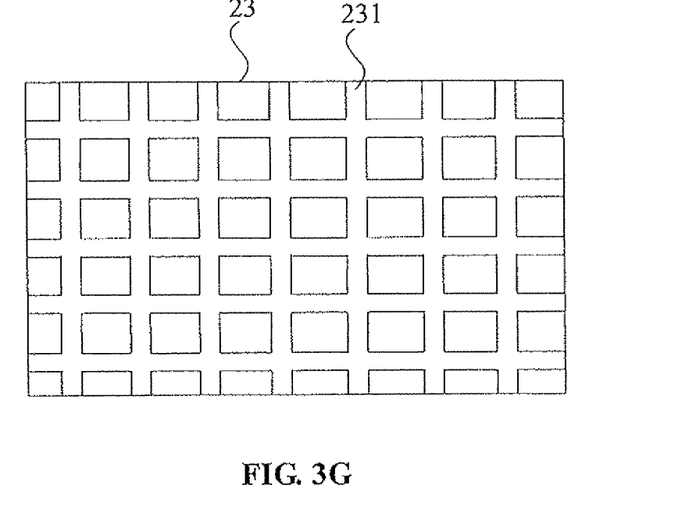

In step S204, provided is a substrate 23 (please also refer to FIG. 3F). The roller 21 having the second sub-transparent dyeable material layer 32 is pressed on the substrate 23 as well as the roller 21 being rolled in direction of labeled "A", so that the second sub-transparent dyeable material layer 32 on the roller 21 having the second sub-transparent dyeable material layer 32 is imprinted on the substrate 23 to form a matrix layer 231 (please refer to FIG. 3G). The matrix layer 231 has a shape of the second pattern 222.

Figure 3H:
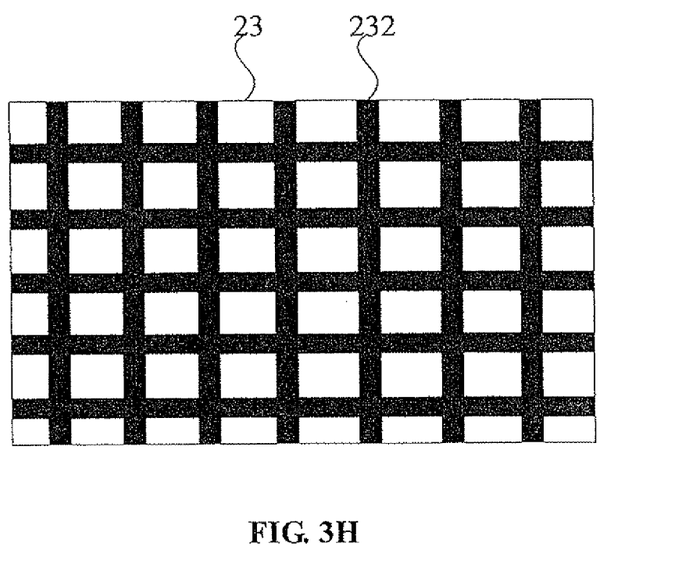

In step S205, a black matrix (BM) layer 232 is formed by dyeing and curing the matrix layer 231 on the substrate 23 having the matrix layer 231 (please refer to FIG. 3H).

Preferably, the transparent dyeable material of the matrix layer 231 is dyed by a micro ink-jet technology to form the BM layer 232 according to the present invention. Of course, that can also dyed by other way, and will not be listed here.

Figure 3I:
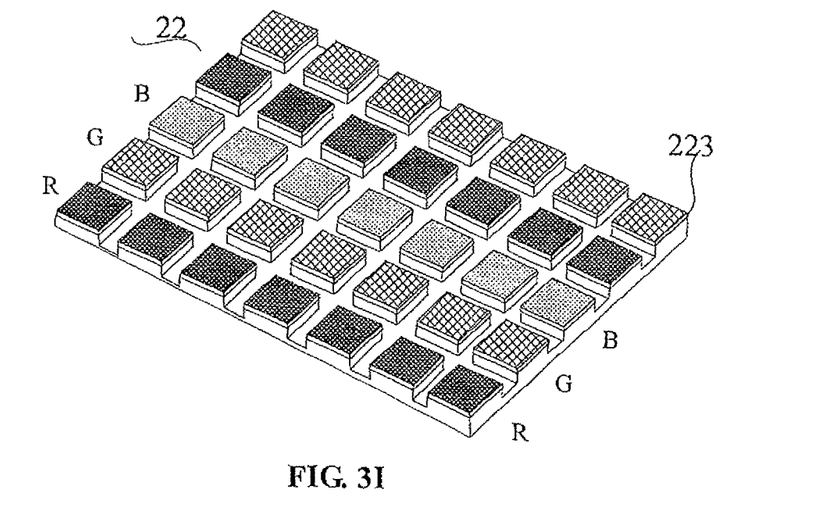

In step S206, the first sub-transparent dyeable material layer 31 on the plate-like template 22 having the first sub-transparent dyeable material layer 31 is dyed to form a plurality of softened color resist layers 223, e.g., in order, R, G and B (please refer to FIG. 3I).

Preferably, the transparent dyeable material having the first pattern 221 of the plate-like template 22 is dyed by another micro ink-jet technology according to the present invention. Of course, that can also dyed by other way, and will not be listed here.

Figure 3J:
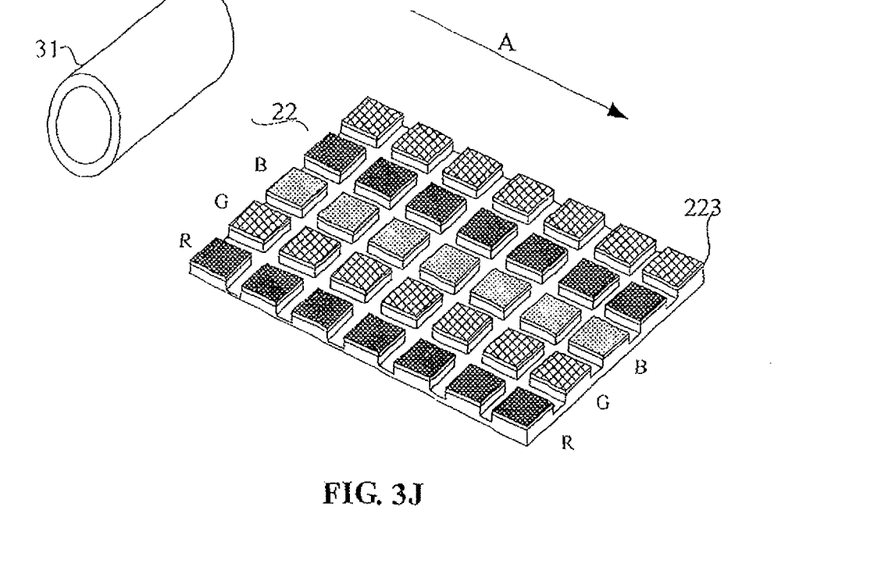

In step S207, provided is an additional roller 31, and then the additional roller 31 is pressed on the plate-like template 22 having the softened color resist layers 223, as well as the additional roller 31 being rolled along a surface thereof, so that the softened color resist layers 223 is imprinted on the additional roller 31 (please refer to FIG. 33).

Figure 3K:
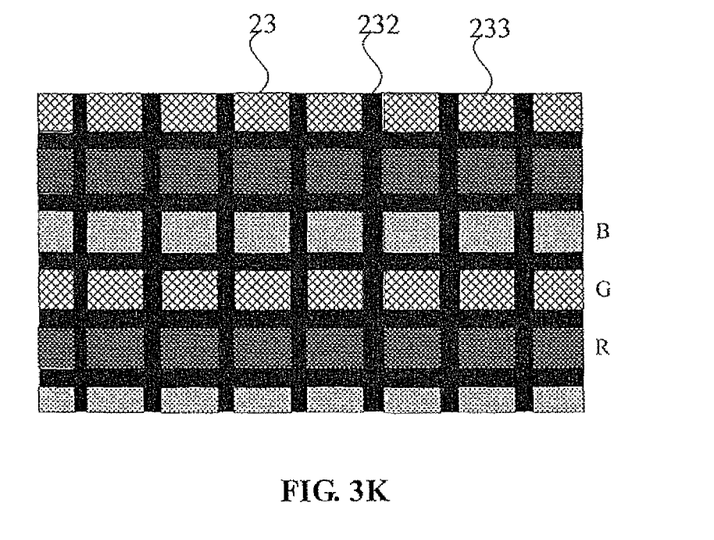

In step S208, the additional roller 31 having the softened color resist layers 223 is rolled along the substrate 23 having the BM layer 232, so as to imprint the softened color resist layers 223 onto the substrate 23 having the BM layer 232, and then the softened color resist layers 223 imprinted on the substrate 23 are cured to form a plurality of color resist layers 233 (please refer to FIG. 3K).

The color resist layers 233 includes a first color resist layer R, a second color resist layer G, and a third color resist layer B. Of course, in some other embodiments, the color resist layers 233 further includes the first color resist layer R, the second color resist layer G, the third color resist layer B, and a fourth color resist layer Y (i.e., yellow), and will not be discussed here.

When the additional roller 31 having the softened color resist layers 223 is rolled along the substrate 23 having the BM layer 232 to imprint the softened color resist layers 223 onto the substrate 23 having the BM layer 232, controlling the BM layer 232 and the softened color resist layers 223 to be interlaced, and forming a structure of FIG. 3K.

In step S209, a transparent conductive layer and spacers are formed on the substrate 23 having the BM layer 232 and the color resist layers 233.

As another preferred embodiment of the present invention, a roller can be used instead of the plate-like template 22 according to step S202 of FIG. 2, that is, a patterned roller. The patterned roller represents as the patterned mold (please refer to FIG. 4).

Figure 4:
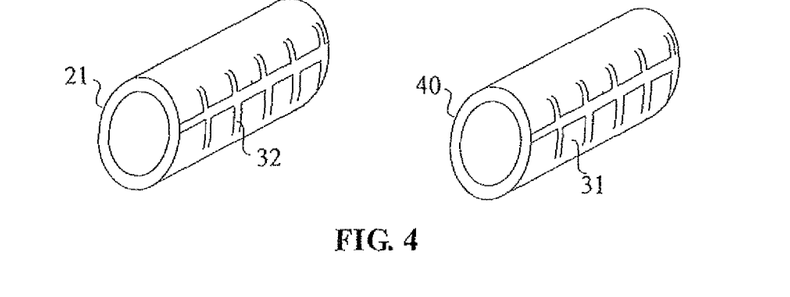
FIG. 4 is a schematic view of a structure of a patterned mold according to another preferred embodiment of the present invention.

In a process of a specific embodiment, the roller 21 having the transparent dyeable material layer 30 can mutually abuts the patterned roller 40 as well as mutually rolling, so that the second sub-transparent dyeable material layer 32 is formed on the roller 21, and the first sub-transparent dyeable material layer 31 is formed on the patterned roller 40. The second sub-transparent dyeable material layer 32 has a shape of the second pattern 222 (as shown in FIG. 3B). The first sub-transparent dyeable material layer 31 has a shape of the first pattern 221 (as shown in FIG. 3B).

Then, provided is the substrate 23, and the roller 21 having the second sub-transparent dyeable material layer 32 is rolled along the substrate 23, so that the second sub-transparent dyeable material layer 32 is imprinted on the substrate 23 to form the matrix layer 231. The BM layer 232 is formed by dyeing and curing the the matrix layer 231 in sequence. The first sub-transparent dyeable material layer 31 on the patterned roller 40 having the first sub-transparent dyeable material layer 31 is dyed to form the softened color resist layers 223. Then, the patterned roller 40 having the softened color resist layers 223 is rolled along the substrate 23 having the BM layer 232, so that the softened color resist layers 223 are imprint on the substrate 23 having the BM layer 232, controlling the BM layer 232 and the softened color resist layers 223 to be interlaced. Final, the softened color resist layers 223 imprinted on the substrate 23 having the BM layer 232 are cured to form the color resist layers 233.

The present invention further provides a color filter, and the color filter includes the BM layer 232 and the color resist layers 233. The BM layer 232 and the color resist layers 233 are arranged and separated from each other, and the BM layer 232 and the color resist layers 233 are formed by dyeing the transparent dyeable material. A specific embodiment can be referred to the above description about a manufacturing process for the color filter, and therefore will not be discussed here.

In a manufacturing process for the color filter according to the present invention, the transparent dyeable material is coated on the roller, and then imprint onto the patterned mold. Thus, the transparent dyeable material is classified into two parts: a part of the transparent dyeable material is retained on the roller, and then imprinted onto the substrate by the roller to form the matrix layer, and then the BM layer is formed by a dyeing process and a curing process in sequence; and another part of the transparent dyeable material is transferred onto the patterned mold for forming the softened color resist layers by the dyeing process, and then forms the color resist layers by a curing process after transferring the softened color resist layers onto the substrate having the BM layer. Apparently, the present invention is capable of sufficiently utilizing the transparent dyeable material, thereby vastly reducing production costs.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a color filter, the method comprising steps of:
    providing a roller, and coating a transparent dyeable material onto the roller;
    providing a patterned mold, a surface of the patterned mold including a first pattern and a second pattern; and then rolling the roller along the surface of the patterned mold, the transparent dyeable material corresponding to the first pattern being adhered on the patterned mold, and the transparent dyeable material corresponding to the second pattern being remained on the roller;
    providing a substrate, and then pressing the roller onto the substrate as well as the roller being rolled along a surface of the substrate, so as to imprint the transparent dyeable material on the roller onto the substrate; and forming a matrix layer having the second pattern on the substrate, and then dyeing and curing the matrix layer to form a black matrix (BM) layer;
    dyeing the transparent dyeable material having the first pattern on the patterned mold to form a plurality of softened color resist layers, imprinting the softened color resist layers onto the substrate having the BM layer, and then curing the softened color resist layers imprinted on the substrate to form a plurality of color resist layers, the color resist layers comprising a first color resist layer, a second color resist layer and a third color resist layer; and
    forming a transparent conductive layer and spacers onto the substrate having the BM layer and the color resist layers.

2. The method for manufacturing a color filter of claim 1, wherein the patterned mold comprises a plate-like template or a roller.

3. The method for manufacturing a color filter of claim 2, wherein the patterned mold is the plate-like template which is a patterned template, and the step of imprinting the softened color resist layers onto the substrate having the BM layer further includes a step of:
    providing an additional roller, and then imprinting the softened color resist layers on the patterned template onto the substrate having the BM layer by the additional roller.

4. The method for manufacturing a color filter of claim 1, wherein the second pattern is sunk in relation to the first pattern, when the roller is rolled along the patterned mold, a force is applied to the roller along a direction which is perpendicular to the surface of the patterned mold, so that the transparent dyeable material that contacts the first pattern is adhered onto the patterned mold, and the transparent dyeable material corresponding to the second pattern is remained on the roller.

5. The method kir manufacturing a color filter of claim 2, wherein the patterned mold is the roller which is a patterned roller, when the patterned roller is rolled along the substrate having the BM layer to imprint the softened color resist layers on the patterned roller onto the substrate having the BM layer, controlling the BM layer and the softened color resist layers to be interlaced.

6. The method for manufacturing a color filter of claim 3, wherein when the additional roller is rolled along the substrate having the BM layer to imprint the softened color resist layers on the additional roller onto the substrate having the BM layer, controlling the BM layer and the softened color resist layers to be interlaced.

7. The method for manufacturing a color filter of claim 1, wherein the transparent dyeable material having the second pattern on the substrate is dyed by a micro ink-jet technology to form the BM layer, and the transparent dyeable material having the first pattern on the patterned mold is dyed by another micro ink-jet technology to form the softened color resist layers.

8. A method for manufacturing a color filter, the method comprising steps of:
    providing a roller, and coating a transparent dyeable material onto the roller;
    providing a patterned mold, a surface of the patterned mold including a first pattern and a second pattern; and then rolling the roller along the surface of the patterned mold, the transparent dyeable material corresponding to the first pattern being adhered on the patterned mold, and the transparent dyeable material corresponding to the second pattern being remained on the roller;
    providing a substrate, and then pressing the roller onto the substrate as well as die roller being rolled along a surface of the substrate, so as to imprint the transparent dyeable material on the roller onto the substrate; and forming a matrix layer having the second pattern on the substrate, and then dyeing and curing the matrix layer to form a black matrix (BM) layer; and
    dyeing the transparent dyeable material having the first pattern on the patterned mold to form a plurality of softened color resist layers, imprinting the softened color resist layers onto the substrate having the BM layer, and then curing the softened color resist layers imprinted on the substrate to form a plurality of color resist layers.

9. The method for manufacturing a color filter of claim 8, wherein the patterned mold comprises a plate-like template or a roller.

10. The method for manufacturing a color filter of claim 9, wherein the patterned mold is the plate-like template which is a patterned template, and the step of imprinting the softened color resist layers onto the substrate having the BM layer further includes a step of:

providing an additional roller, and then imprinting the softened color resist layers on the patterned template onto the substrate having the BM layer by the additional roller.

11. The method for manufacturing a color filter of claim 8, wherein after the softened color resist layers imprinted on the substrate are cured to form the color resist layers, and further comprises the following step of:

forming a transparent conductive layer and spacers onto the substrate having the BM layer and the color resist layers.

12. The method for manufacturing a color filter of claim 8, wherein the second pattern is sunk in relation to the first pattern, when the roller is rolled along the patterned mold, a force is applied to the roller along a direction which is perpendicular to the surface of the patterned mold, so that the transparent dyeable material that contacts the first pattern is adhered onto the patterned mold, and the transparent dyeable material corresponding to the second pattern is remained on the roller.

13. The method for manufacturing a color filter of claim 9, wherein the patterned mold is the roller which is a patterned roller, when the patterned roller is rolled along the substrate having the BM layer to imprint the softened color resist layers on the patterned roller onto the substrate having the BM layer, controlling the BM layer and the softened color resist layers to be interlaced.

14. The method for manufacturing a color filter of claim 10, wherein when the additional roller is rolled along the substrate having the BM layer to imprint the softened color resist layers on the additional roller onto the substrate having the BM layer, controlling the BM layer and the softened color resist layers to be interlaced.

15. The method for manufacturing a color filter of claim 8, wherein the color resist layers comprise a first color resist layer, a second color resist layer and a third color resist layer.

16. The method for manufacturing a color filter of claim 8, wherein the transparent dyeable material having the second pattern on the substrate is dyed by a micro ink-jet technology to form the BM layer, and the transparent dyeable material having the first pattern on the patterned mold is dyed by another micro ink-jet technology to form the softened color resist layers.

\* \* \* \* \*

UNITED STATES PATENT AND TRADEMARK OFFICE
CERTIFICATE OF CORRECTION

PATENT NO. : 9,110,328 B2
APPLICATION NO. : 13/641131
DATED : August 18, 2015
INVENTOR(S) : Hsiao-hsien Chen

It is certified that error appears in the above-identified patent and that said Letters Patent is hereby corrected as shown below:

In the claims:

Column 8, Claim 5 line 15 should be corrected as follows:
Change
-- kir --
to
"for"

Column 8, Claim 8 line 47 should be corrected as follows:
Change
-- die --
to
"the"

Signed and Sealed this
Twenty-ninth Day of December, 2015

Michelle K. Lee
*Director of the United States Patent and Trademark Office*